UNITED STATES PATENT OFFICE.

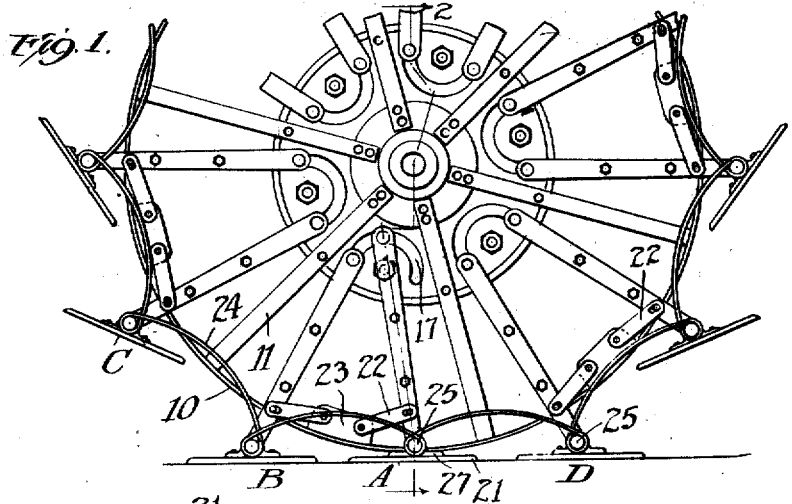
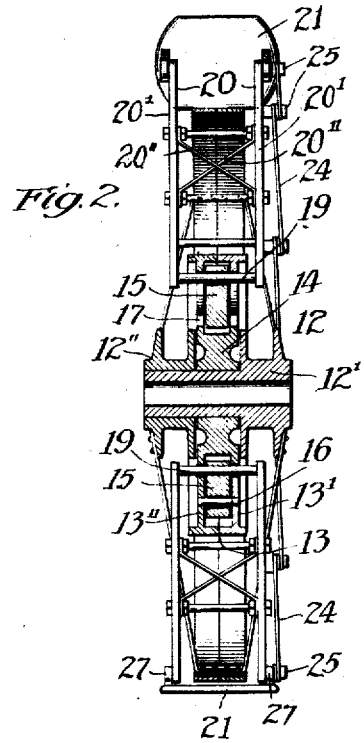
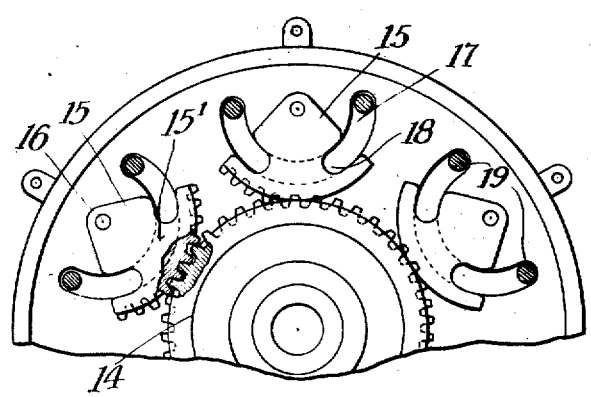
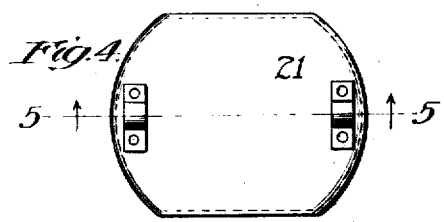
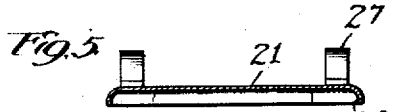

WILLIAM L. MARTIN, OF CHICAGO, ILLINOIS.

TRACTION-WHEEL.

932,798.

Specification of Letters Patent.  Patented Aug. 31, 1909.

Application filed December 7, 1908. Serial No. 466,327.

*To all whom it may concern:*

Be it known that I, WILLIAM L. MARTIN, a citizen of the United States, residing at Chicago, in the county of Cook and State of Illinois, have invented certain new and useful Improvements in Traction-Wheels, of which the following is a specification.

My invention relates to traction wheels for traction engines, having trucks and the like, and particularly to traction wheels of the general character described in my prior patent No. 902,426, dated Oct. 27th, 1908, wherein the bearing members or feet are connected in pairs for inward and outward movement relative to a central frame, in such manner that when one bearing member is moved inward the companion member of its pair is held or locked in outermost position in a line therewith tangent to the tread circle of the wheel.

The construction embodied in my prior patent referred to, causes to be imparted to all of the bearing members which are functionally inactive or idle, movements coincident with the movement of the functionally active members.

One of the salient objects of the present invention is to provide a construction wherein the bearing members, movable approximately radially with respect to a frame, are connected in pairs in such manner that one member of a pair, when in innermost position, locks the other member in outermost position but may resume its outward position without moving its fellow member, and wherein means are provided for normally maintaining all of the bearing members in outermost position, so that no member is moved inwardly save when in functional operation. And other and further objects of my invention will become apparent to those skilled in the art from the following description taken in conjunction with the accompanying drawing, wherein:

Figure 1 is a side elevation of a portion of a wheel; Fig. 2 is a central vertical section; Fig. 3 is an enlarged view of a fragment of the gearing in its housing; Figs. 4 and 5 are plan and sectional views of an improved bearing member.

The wheel in general consists of a rigid frame, bearing members or feet arranged radially beyond the frame, mounted for approximately radial movement with respect thereto upon connecting links or legs, coupled together in pairs so that when one member of a pair is moved to its innermost position the other member of said pair is moved to its outermost position, and said pairs of legs being connected together so that as a leg of one pair is moved to innermost position the proximate leg of the next adjoining pair is held in outermost position. The connections between the carrying legs constituting a pair, and between the elements of the several pairs, are movable in such manner that as the weight of the wheel and its load is being shifted from one bearing member to the next the load is distributed between two bearing members, the arrangement being such that not less than two members may normally be positioned for contact with the ground to carry the load.

In the construction shown the frame comprises a rim 10 connected by rigid spokes 11 with a separable hub 12, constructed of two telescoping members 12′ and 12″, having projecting therefrom in confronting relation coöperating halves 13′ and 13″ of a housing 13 of annular form in which is loosely mounted for rotation upon the sleeve portion of the hub member 12′ a gear wheel 14 with which mesh gear-sectors 15 disposed at regular intervals in the housing and pivoted on pins 16 therein, said sectors 15 constituting rocking thrust blocks for associating the hereinafter described legs in pairs, and therefore, being in number equal to half the number of bearing members and legs to be provided. In each side of the housing 13 there are made arcuate slots 17 about the pivots 16 as centers, and in each sector 15 are made coincident bearing recesses 18 opening to opposite edges of the sector and including between them the thrust body 15′. Through the slots 17 for association with the opposite recesses of each sector, pass two pins 19 bearing at their outer extremities bars 20′ 20′ suitably connected together as at 20″ to jointly constitute a leg or link 20 extending beyond the rim 10 and having pivotally connected to its extremity a bearing member or foot 21, each said leg being guided in its movement by short links 22 pivotally connected to the bars 20′ 20′, and at their opposite extremities pivotally connected to angle pieces 23 carried by the rim 10. The connection of the links 22 to the angle pieces 23 may, if desired, be made transversely yielding, as and for the purpose described in my prior patent.

For maintaining the legs 20 and their connected bearing members 21 normally in outward position, I provide a spring structure, which is preferably a continuous wire spring 24, connected *seriatim* to the pins 25 which effect pivotal connection between the bearing members and their respective legs, said spring-wire making a coil around each such pin and providing a spring bow between adjoining pins. Such continuous spring or spring circle, as I will term it, obviously tends to maintain all of the feet in outermost position.

Each foot, or bearing member 21, is preferably of the construction shown in Figs. 4 and 5 being provided with straight parallel front and rear edges and arcuate ends, said ends being struck from a common center, which, when the bearing member is attached to the wheel is directly in the tread center of the wheel. The foot is provided with a downturned perometric flange 26 flaring outward slightly from the body or plate portion of the foot, and ears 27 are provided for pivotally connecting the foot with the side bars of its leg. The relative arrangement of the feet, legs, and their connections is such that when any foot is moved to its innermost position and the contiguous feet on both sides thereof are held in their outermost positions, the three successive feet may stand in alinement at a tangent to the tread circle of the wheel which follows the innermost points of movement of the feet, as shown in Fig. 1. The thrust body 15′ of each sector 15 is of such size that when one foot is forced to innermost position said thrust body positively holds the companion foot of the pair in outermost position and the interconnection of the several sectors, through the master gear 14, insures that all the sectors shall stand in position to positively hold the alternate feet throughout the entire series in outermost position so that it is insured that when any foot is in innermost position the peripherally contiguous feet on both sides thereof are held positively in outermost position.

It will further be seen that each sector is capable of moving either leg and foot with which it is associated only by a forward thrust, and then when a sector is in position to thrust one foot to outermost position the other foot of its pair may move inward or outward without interference with the sector. And it will further be apparent that the spring circle 24 will normally hold all of the free feet in outermost position, so that it is provided that normally all feet will stand in outermost position save those which are forced from such position by contact with the ground under the weight of the load. Thus the operation is as follows: When the wheel passes from the position shown in Fig. 1, where the foot A is squarely beneath the axle, toward a position where foot B will be directly beneath the axle, the foot B will be forced inward and the sector in the central housing will force the foot A outward distributing the weight between such two feet. The rocking of the sector incident to such change in position will rotarily move the master gear 14 which communicates to all of its sectors the motion imparted to it by the motion-initiating sector of the feet A, B. Thus when the foot B is in innermost position the thrust of its sector locks the foot A in outermost position, and the movement of the coincidently operating sectors of the other pair will have locked the right hand foot of each pair in outermost position, so that the foot C will be firmly held in outermost position and the feet B, C, A, will occupy the same relative positions, tangent to the tread circle of the wheel, which are shown in Fig. 1 by the feet A, B, D. But except where contact with the ground forces a foot inward, the spring circle maintains all of the feet outward so that the movement of the sector has no external effect upon the wheel save as affecting the functionally active bearing members.

It will be understood that my invention may be embodied in traction wheels structurally different in many features from that herein particularly shown for purposes of full disclosure, and I do not desire to be understood as limiting my invention to the particular construction shown further than as specified in the claims.

Having described my invention, what I claim is;

1. In a traction wheel, a frame, bearing members beyond the frame, movable in a generally radial direction with respect to the frame, and connections between pairs of said bearing members whereby one member of a pair may communicate a thrust only and not a pull to the other member of the pair.

2. In a traction wheel, a frame, bearing members thereon, inwardly movable and normally maintained in outermost position, and means for connecting any bearing when in innermost position with the two circumferentially contiguous bearing members to hold them positively in outermost position.

3. In a traction wheel, a frame, bearing members carried thereby and therebeyond, radially movable with respect thereto, means yieldingly holding said bearing members in outermost position, means associating said members in pairs for locking one member of the pair in outermost position when the other is in innermost position, and means connecting the several pairs for locking the corresponding members of all the other pairs in outermost position when any one member is so locked.

4. In a traction wheel, a frame, bearing members beyond the frame, legs carrying said bearing members movable in a generally radial direction with respect to the frame, rocking thrust blocks upon the frame associating said legs in pairs, said blocks being arranged to communicate movement in an outward direction only to either member of the pair and to hold one member of the pair in outermost position when the other member is in innermost position; and means connecting said thrust blocks for synchronous movement.

5. In a traction wheel, a frame, a plurality of rocking thrust blocks mounted on said frame, means connecting all of said thrust blocks for synchronous movement, legs extending generally radially with respect to the frame and movable therein associated in pairs with the thrust blocks so that either member of a pair when moved to innermost position may, through the thrust block, hold the other member of its pair in outermost position, such thrust block being arranged to communicate motion in an outward direction only to each member of the pair of legs associated therewith, means normally maintaining all of the legs in outermost position, and bearing members carried by said legs beyond the frame.

In testimony whereof I hereunto set my hand in the presence of two witnesses.

WILLIAM L. MARTIN.

In the presence of—
 FORÉE BAIN,
 MARY F. ALLEN.